United States Patent [19]

Leah

[11] 4,435,472

[45] Mar. 6, 1984

[54] ADHERENT, ACID CURED RESIN PROTECTIVE COATINGS FOR CONCRETE AND STEEL

[75] Inventor: George R. Leah, New Kensington, Pa.

[73] Assignee: Pennwalt Corporation, Philadelphia, Pa.

[21] Appl. No.: 412,329

[22] Filed: Aug. 27, 1982

[51] Int. Cl.³ .......................... B32B 9/06; B05D 1/36
[52] U.S. Cl. .................................. 428/333; 427/403; 427/407.1; 427/409; 428/450; 428/451; 428/454; 428/457; 428/460; 428/462; 428/463; 428/500; 428/506; 428/521; 428/522; 428/524; 428/703
[58] Field of Search .................. 427/407.1, 409, 393.6, 427/403, 388.2, 388.3; 428/333, 450, 451, 454, 457, 460, 462, 463, 506, 500, 521, 522, 524, 703

[56] References Cited

U.S. PATENT DOCUMENTS

| | | | |
|---|---|---|---|
| 2,918,442 | 12/1959 | Gerrard et al. | 260/29.3 |
| 3,030,260 | 4/1962 | Metzler et al. | 156/305 |
| 3,051,666 | 8/1962 | Snodden | 260/3.5 |
| 3,089,784 | 5/1963 | Dowling | 117/70 |
| 3,400,090 | 9/1968 | Maslow | 260/23.7 |
| 3,411,943 | 11/1968 | Bragg | 117/70 |
| 3,429,769 | 2/1969 | Ippen et al. | 161/217 |
| 3,515,611 | 6/1970 | Muhlberg et al. | 156/71 |
| 3,520,753 | 7/1970 | Ryan et al. | 156/246 |
| 3,528,943 | 9/1970 | Goldberg et al. | 260/41 |
| 3,733,242 | 5/1973 | Davis | 161/160 |
| 3,764,372 | 10/1973 | Kenton | 427/393.6 |
| 3,922,437 | 11/1975 | Kitta et al. | 428/383 |
| 4,062,715 | 12/1977 | Manner et al. | 156/334 |
| 4,151,025 | 4/1979 | Jacobs | 156/71 |
| 4,172,912 | 10/1979 | Noji et al. | 427/375 |
| 4,174,993 | 11/1979 | Fujii et al. | 156/244.11 |
| 4,193,831 | 3/1980 | Fujii et al. | 156/309 |
| 4,237,177 | 12/1980 | Slama et al. | 428/215 |
| 4,263,349 | 4/1981 | Menelly et al. | 427/352 |
| 4,268,579 | 5/1981 | Suzuki et al. | 428/413 |
| 4,279,950 | 7/1981 | Tanaka et al. | 427/393.6 |

Primary Examiner—Thurman K. Page

[57] ABSTRACT

Acid cured, polymer protective layers are bonded to metal or cement surfaces using a primer coating of an acid stable, thermoplastic elastomer such as a block copolymer of styrene-butadiene.

11 Claims, No Drawings

ADHERENT, ACID CURED RESIN PROTECTIVE COATINGS FOR CONCRETE AND STEEL

BACKGROUND OF THE INVENTION

This invention relates generally to the field of corrosion resistant linings and coatings made with certain organic monoliths and mortars. More specifically, it relates to the process of bonding acid catalyzed furan and phenolic resin based linings and coatings to portland cement concrete or metal substrates.

There are essentially two types of organic resin based monoliths and mortars used in corrosion resistant coatings and linings. First are products based on furan resin solutions; second are products based on phenolic resin solutions. These solutions are combined with a powder portion prior to use. The powder consists mainly of inert fillers, such as sand, silica, clay, carbon, barite, etc., plus small amounts of acid catalysts, which include, for example, a variety of inorganic and organic acids and some organic acid anhydrides and chlorides. The particular type of catalyst is selected mainly to achieve the desired hardening and setting time for the installed monoliths and mortars. The hardening time is adjusted from 15 minutes to a few hours. The products are either used as monolithic corrosion resistant coatings and membranes or as mortars for installing corrosion resistant brick linings.

Furan and phenolic monoliths and mortars, when properly hardened, are highly resistant to most strong acids and bases and to most solvents. They are widely used, therefore, as materials of construction in the chemical industry and also in other industries where corrosive conditions are encountered (e.g. power plants, steel mills, paper industry). The products are used in many different places, for instance, reaction vessels, floors, trenches, pits, catch basins, etc.

With all their usefulness, both furan and phenolic products are afflicted with a serious drawback when used with certain substrates. A monolith or a mortar should adhere tightly to its substrate to become an integrated part of the structure. In many cases a tight bond is essential for the proper function of an installed lining. The two most common substrates, i.e., the surface of structural parts to be lined or coated, are portland cement concrete and carbon steel. Neither furan nor phenolic products will adhere to these materials. The reason for this phenomenon is that the acidic compounds used for curing the cements and mortars are true catalysts, i.e., they are not used up or transformed but stay in the matrix as acids. Enough of the acid slowly bleeds out at the resin cement-substrate interface to react with either the steel or the portland cement. Both steel and portland cement are acid soluble and the reaction products formed at the interface destroy the initial bond. Because of the adhesion loss, furan and phenolics are not used in many applications where they would be superior in all other respects. In some cases, primers based on epoxy resins, polyesters and phenolic resins have been used. However, these primers are seldom used because the epoxides and polyesters require the mixing of two or more components, have a limited pot life, and are fairly expensive. Phenolic primers are hard to apply.

Another problem associated with the use of resin monoliths and mortars, especially the furans, is that they are subject to a considerable shrinkage at curing. The forces generated, especially at the layer thicknesses required for a corrosion resistant lining or coating, are tremendous and can lead to breakage of the bond between mortar and primer.

Single component primer materials have now been found which greatly improve the adhesion of acid catalyzed phenolic and furan resin coatings to metal and portland cement substrates which are easy to apply and which provide a long lasting, bonded coating system.

BRIEF SUMMARY OF THE INVENTION

In accordance with the invention, there is provided a method of forming an adherent, acid cured polymer layer on a substrate comprising priming the substrate with a layer of an acid stable thermoplastic elastomer before applying the polymer large. Also provided is a corrosion resistant coated structure comprising a substrate coated with an inner layer of an acid resistant, thermoplastic elastomer primer and an outer protective layer of an acid cured, corrosion resistant polymer.

DETAILED DESCRIPTION

Both the furan and phenolic monoliths and mortars are commercially available as two-part packages. The packages consist of the resin solution and the mortar powder. The powder is a mixture of inert fillers, for example, quartz sand, carbon, graphite, barium sulfate, etc. plus the hardeners. The hardeners are solid acidic compounds, such as, for example, sodium bisulfate, sulfamic acid, p-toluene sulfonic acid and p-toluene sulfochloride, used either alone or as a mixture. The amount of hardener in the powder mixture is less than 10%. Since these acid hardeners are true catalysts, i.e., they are not used up in the reaction, the type and amount used depends of the reactivity of a particular resin solution and the required speed of the reaction.

For relatively thin monolithic coatings and mortars, the powder is mixed into the resin in the specified proportions, for example, from about 1.0 to 3.5 parts by weight of powder per part by weight of resin solution. For thicker applications, such as polymer concrete coatings, from about 8.0 to 10.0 parts by weight of powder are used. The mortar has to be used immediately, since the open work life, i.e., the time a mason can work it with a trowel, is limited, usually to about 30 minutes.

The so-called resin solutions are actually not solutions in the sense that a polymer is dissolved in an inert solvent. Rather, they are a mixture of pre-polymers (i.e., molecules with from 2–10 repeat units) and may include some monomers and unreacted starting material. If a solvent is added, it has to be of the reactive type, i.e., it has to be able to cross-link with the pre-polymers and become a part of the polymer matrix. For example, furfural is used in both the furan and the phenolic resin solutions as a means to reduce viscosity.

To prepare a furan resin solution, furfuryl alcohol is carefully reacted using an acid catalyst (e.g., sulfuric acid). When the desired degree of polymerization is reached, the batch is neutralized to stop the reaction. If that is not done, the entire content of the reaction vessel would become one solid block. The viscous liquid obtained still contains some unreacted furfuryl alcohol. After stopping the reaction, the batch can be diluted with furfural if a lower viscosity is desired.

The reaction that takes place is a typical polycondensation reaction, i.e., under the influence of hydrogen ions the furfuryl alcohol molecules react with each other to form a polymeric network and release water in the process.

The phenolic resins are also formed by a polycondensation reaction. An acid is used as the catalyst, although the reaction mixture can be catalized with alkali also which results in somewhat different products. The raw materials for the manufacturing of phenolic resins are mainly phenol and formaldehyde, but metacresol or 3,5 xylenol can be used instead of phenol, and formaldehyde can be replaced (at least partly) by other aldehydes. The formaldehyde forms methylene and methoxy bridges between the phenolic rings, creating a three-dimensional polymeric network since there are three active sites on the phenolic molecules. In manufacturing the resin solution the reaction is stopped at a modest degree of polymerization. The resulting liquid product still contains some free phenol and aldehyde.

The polymers are generally applied to provide cured thicknesses of at least about ⅛ inch, preferably ¼ to 3 inches to provide a corrosion protective layer for portland cement or metal substrates or to provide a mortar layer to bond tile or brick linings to these substrates. Thicker layers are used for certain applications such as in filling holes and providing a new surface over damaged concrete (e.g., 4 or more inches).

The primer coating layers are formed from thermoplastic elastomers which will provide good adhesion to both the substrate and the organic resin protective coating layer. Because of the elastomeric nature of primers, they will not lose the bond due to shrinkage of the monolith or mortar because the primer provides sufficient elongation to accomodate dimensional changes between the resin and the substrate. The elastomer must also be resistant to attack by the acid catalysts used to harden the coating layer. In this respect, the degree of residual unsaturation must be below a level where acid attack would cause degradation and loss of adhesion. Elastomers which give superior results are two phase, block copolymers of rubber and plastic which are marketed by Shell under the trademark KRATON ® 1000 series as construction adhesives. The plastic phase is polystyrene. The rubber phase is polybutadiene or polyisoprene. The materials are thermoplastic and provide strong, stable bonds. Other elastomers which provide improved bond strengths include chlorosulfonated polyethylene, styrene-butadiene copolymer 1502 and neoprene. The elastomers are dissolved in a suitable organic solvent such as xylene, toluene and other aromatic hydrocarbons and applied to the cleaned substrate by conventional means such as brushing, rolling, or spraying to dry thicknesses of at least about 0.2 mil. Preferred thicknesses are about 1 to 10 mils. Thicknesses greater than 10 mils can be used. The elastomer solutions are generally prepared to contain from about 5 to 30% by weight of elastomer, depending on the solution viscosity of the particular type of elastomer.

EXAMPLE 1

Steel blocks were sandblasted and given two coats of a 20% by weight solution of a styrene-butadiene block copolymer (KRATON ® 1101 thermoplastic rubber from Shell, solution viscosity of a 25% wt. solution in toluene=4,000 CPS) in xylene to provide a primer coating thickness of about 5 mils. A drying time of 45 to 60 minutes was allowed between coats so that the coating was dry to the touch. Blocks were bonded together with a ¼" thick layer of a filled, acid cured furan mortar (FURALAC ® Green Panel Mortar from Pennwalt Corporation) and cured for 14 days at room temperature (70° F.). Control blocks were bonded without using the primer. The bond strength was determined by pulling the blocks (2"×2"=4 square inches of bonded surface area) apart in a direction normal to the bonded surfaces (tensile mode). The bond strength of the primed specimen was 620 psi. The bond strength of the control was 132 psi.

EXAMPLE 2

Steel blocks were sandblasted and given two coats of a 20% by weight solution of a styrene-butadiene block copolymer (KRATON ® 1102 thermoplastic rubber from Shell, solution viscosity of a 25% wt. solution in toluene=1,200 CPS) in xylene to provide a primer coating thickness of about 5 mils with a 45 to 60 minute drying time between coats. Pairs of blocks were bonded together with ¼" thick layers of furan mortar (ASPLIT ® VP 701 from Pennwalt Corporation). Control blocks which were not primed were also prepared using the two mortars. The samples were cured for 14 days at room temperature (70° F.). The bond strengths are given in Table I.

TABLE I

| | Bond Strength | | | |
|---|---|---|---|---|
| | VP701 Furan Mortar | | FURALAC Furan Mortar | |
| | Primed | Control | Primed | Control |
| #1 | 613 psi | 80 psi | 600 psi | 232 psi |
| #2 | 525 psi | 89 psi | 450 psi | 202 psi |
| #3 | 569 psi | 84 psi | 525 psi | 217 psi |

EXAMPLE 3

The styrene-butadiene block copolymer (SB) primer solution of Example 2 was used to coat acid etched concrete blocks. The blocks were bonded with the furan mortars as in Example 2 and cured at 70° F. for 14 days. As a comparison test blocks were coated with a polyester primer coat and an epoxy primer coat. The results are given in Table II:

TABLE II

| | Bond Strength | | |
|---|---|---|---|
| | Polyester Primer | Epoxy Primer | SB Primer |
| VP701 Furan | 516 psi | 177 psi | 605 psi |
| VP701 Furan | 482 psi | 153 psi | 580 psi |
| Ave. | 499 psi | 165 psi | 592 psi |
| FURALAC Furan | 457 psi | 255 psi | 560 psi |
| FURALAC Furan | 553 psi | 220 psi | 496 psi |
| Ave. | 505 psi | 238 psi | 528 psi |

The failures of the epoxy primed samples occurred as 100% adhesion failure. With the polyester and VP701 resin the failure was 100% adhesion. With the polyester and FURALAC resin one sample was 100% adhesion failure and the 553 psi sample 100% cohesion failure. With the SB primer and VP 701 Furan one sample (605) was 25/75 adhesion/cohesion failure and the remaining samples with VP 701 Furan and the two Furalac furans was 100% cohesion failure.

EXAMPLE 4

In order to illustrate the stability of the coating bond with time, samples of sandblasted steel blocks were coated as in Example 2 with the KRATON 1102 rubber primer and the VP 701 furan mortar. Three samples gave an average psi to failure of 491 after two weeks at 70° F. After aging about eleven months, three samples gave an average psi to failure of 589 psi. These results demonstrate the stability of the bond with time. The failures were in all cases 100% adhesion of the resin to the primer.

EXAMPLE 5

VP 701 furan coatings were bonded to sandblasted steel specimens with two coats of each of various elastomers in xylene and cured for two weeks with the results given in Table III:

TABLE III

| Adhesive | Ave. Bond Strengths |
| --- | --- |
| KRATON 1102 block copolymer (20%) | 585 psi |
| HYPALON 40 chlorosulfonated polyethylene (20%) | 324 psi |
| Neoprene (20%) | 250 psi |
| Styrene-butadiene copolymer (1502) (15-20%) | 215 psi |
| Natural rubber (5%) | 191 psi |
| HYCAR 1402 (butadiene-acrylonitrile) | 71 psi |

These results illustrate the different strengths which are obtained using different elastomers. The butadiene-acrylonitrile polymer gave no improvement over unprimed samples. Although several elastomers gave improved bonds of over about 200 psi. The block copolymer was significantly better than the other elastomers.

The foregoing has described the formation of adherent acid cured polymer layers on substrates of steel and concrete. The layers not only provide excellent monolothic corrosion resistant outer coatings and mortars, but can also be used as binder layers and mortars to adhere lining materials such as tile or brick to steel or concrete and such use is intended to be within the scope of the invention.

I claim:

1. A method of forming an adherent, acid cured, coating on an acid soluble substrate comprising applying a primer layer, which includes an acid stable, thermoplastic elastomer having a degree of residual unsaturation below a level where acid attack would cause degradation and loss of adhesion to the substance, to the substrate surface and then forming a coating layer, by applying and curing a coating composition which includes an acid curable furan or phenolic polymer, an acid hardener and an inert filler, on the primer layer.

2. A method of forming an adherent, acid cured, corrosion resistant polymer coating on a substrate having an acid soluble surface comprising applying a primer layer, which includes an acid stable elastomer selected from the group consisting of styrene-polybutadiene block copolymers, styrene-polyisoprene block polymers, chlorosulfonated polyethylene, styrene-butadiene copolymers, and neoprene, to the substrate and then forming a protective coating, by applying and curing a coating composition which includes an acid curable furan or phenolic polymer, an acid hardener and an inert filler on the primer layer.

3. The method of claim 2 wherein the substrate is steel or concrete.

4. The method of claim 2 wherein the primer layer has a thickness of at least about 0.2 mil and the protective coating has a thickness of at least about ⅛ inch.

5. The method of claim 2 wherein the elastomer is a styrene-polybutadiene block copolymer.

6. A corrosion resistant coated structure comprising a substrate having an acid soluble surface, a primer layer coated on the surface of the substrate, which layer comprises an acid stable, thermoplastic elastomer selected from the group consisting of styrene-polybutadiene block copolymers, styrene-polyisoprene block polymers, chlorosulfonated polyethylene, styrene-butadiene copolymers, and neoprene, and a corrosion resistant layer coated on the primer layer, which layer comprises an acid cured, corrosion resistant furan or phenolic polymer.

7. The structure of claim 6 wherein the corrosion resistant layer is an outer protective layer for the structure.

8. The article of claim 6 wherein the substrate is steel or concrete.

9. The article of claim 6 wherein the primer layer has a thickness of at least about 0.2 mil and the corrosion resistant layer has a thickness of at least about ⅛ inch.

10. The article of claim 6 wherein the elastomer is a styrene-polybutadiene block copolymer.

11. The article of claim 6 wherein the corrosion resistant layer includes an inert filler and an acid hardener.

* * * * *